United States Patent
Thomas et al.

(10) Patent No.: US 8,194,149 B2
(45) Date of Patent: Jun. 5, 2012

(54) INFRARED-AIDED DEPTH ESTIMATION

(75) Inventors: Anil Thomas, San Ramon, CA (US);
Indu Mahadevan, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 12/495,421

(22) Filed: Jun. 30, 2009

(65) Prior Publication Data
US 2010/0328475 A1 Dec. 30, 2010

(51) Int. Cl.
*H04N 5/228* (2006.01)
(52) U.S. Cl. .................................. 348/222.1; 348/372
(58) Field of Classification Search ............... 348/222.1, 348/272, 274, 370, 371
See application file for complete search history.

(56) References Cited

U.S. PATENT DOCUMENTS

| | | | |
|---|---|---|---|
| 2002/0172514 A1* | 11/2002 | Gabello et al. | 396/109 |
| 2004/0263510 A1* | 12/2004 | Marschner et al. | 345/419 |
| 2008/0283729 A1* | 11/2008 | Hosaka | 250/208.1 |
| 2009/0002531 A1* | 1/2009 | Godaiin | 348/294 |
| 2010/0020209 A1* | 1/2010 | Kim | 348/294 |

* cited by examiner

*Primary Examiner* — Gevell Selby
(74) *Attorney, Agent, or Firm* — Merchant & Gould

(57) ABSTRACT

Systems and methods are disclosed for creating image maps. Some embodiments include a method comprising the steps of: capturing a first image illuminated by natural light and capturing a second image illuminated by infrared light. The second image may be captured at the same time as the first image. The R, G, and B values for each pixel in the first image may be determined. The intensity for each pixel in the first image may be calculated. An IR intensity for each pixel in the second image may be calculated. A depth value may then be estimated for each pixel using the ratio of the IR intensity and the intensity of corresponding pixels in the first and second images.

19 Claims, 4 Drawing Sheets

INFRARED-AIDED DEPTH ESTIMATION

FIELD OF THE DISCLOSURE

The present disclosure relates to the estimation of depth of objects in an image and the creation of image depth maps.

BACKGROUND

Obtaining depth maps of images is useful for a number of applications including 3D video conferencing. While it may be possible to create a fairly accurate image depth map through the use of a laser scanner, laser scanners may be highly impractical for video conferencing applications due to issues with cost and speed. Thus, there is a need for a solution to create accurate image depth maps without the constraints which may occur with the use of laser scanners.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

DESCRIPTION OF EXAMPLE EMBODIMENTS

Overview

Figure 1:
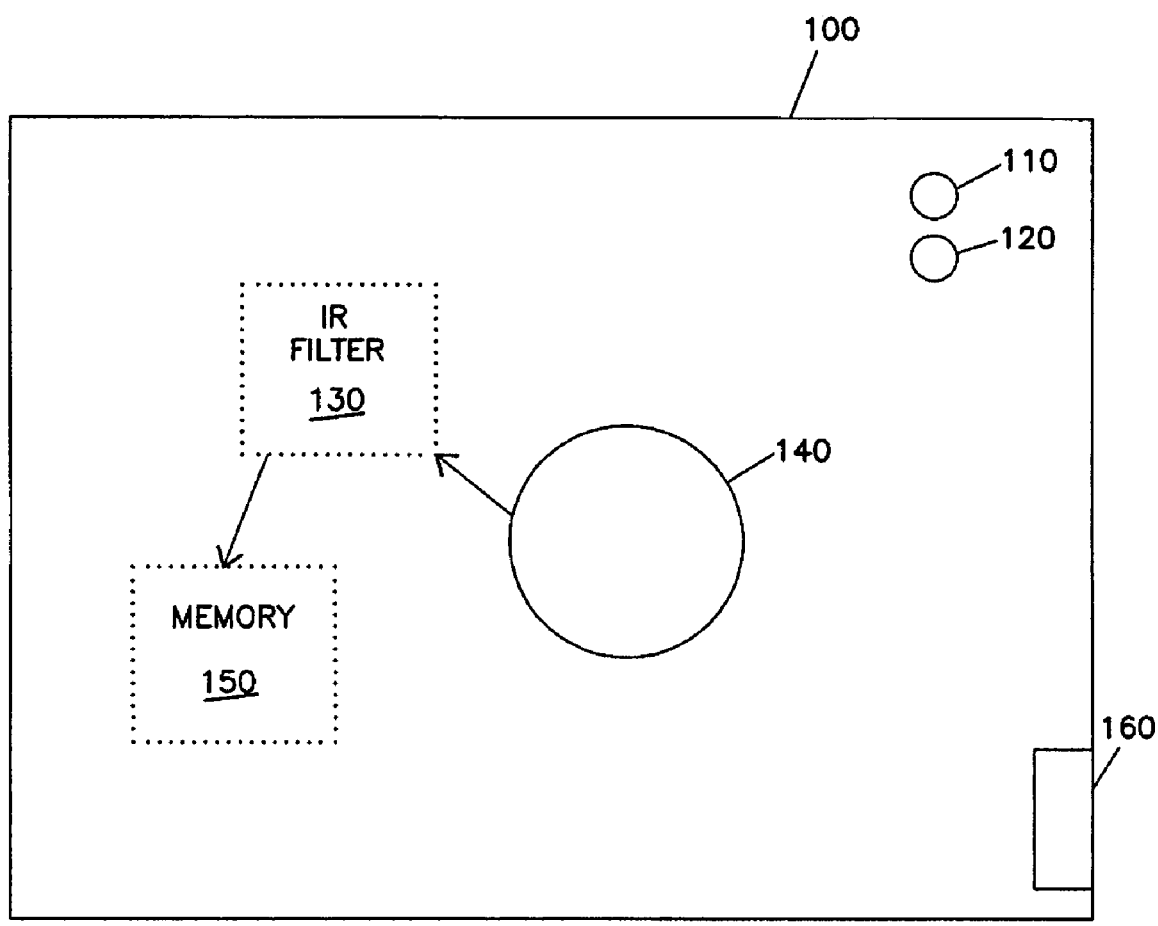
FIG. 1 is a block diagram of an operating environment of the invention.

Consistent with embodiments of the present invention, systems and methods are disclosed for creating image maps. Some embodiments include a method comprising the steps of: capturing a first image illuminated by natural light; capturing a second image illuminated by infrared light, wherein the second image is captured at the same time as the first image; determining the R, G, and B values for each pixel in the first image; calculating the intensity for each pixel in the first image; calculating an IR intensity for each pixel in the second image; estimating a depth value for each pixel using the ratio of the IR intensity and the intensity of corresponding pixels in the first and second images; and storing the estimated depth value for each pixel in an image depth map.

Some embodiments may include a camera comprising: an IR light source, wherein the IR light source is continuously on while the camera is in an image-capture mode; a natural light source; an IR filter; a processor associated with the camera programmed to run a demosaicing algorithm to process IR intensity and IR reflectance; the processor further programmed to create an RGB version and an IR version of each captured image frame; and the processor further programmed to perform a comparison of the RGB version and the IR version to calculate a depth map for a final version of each captured image frame.

Both the foregoing general description and the following detailed description are examples and explanatory only, and should not be considered to restrict the invention's scope, as described and claimed. Further features and/or variations may be provided in addition to those set for the herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Detailed Description

Accurate depth estimation may be provided with the aid of a camera equipped with infrared capabilities. Infrared light may be used to illuminate a scene and gauge the depth of each point by the amount of infrared light reflected back from each point. Objects closer to the infrared source may be illuminated more intensely and may have a higher potential to reflect more infrared light back.

It may be desired to correct for the reflectivity of the objects to achieve a more accurate depth map. For example, an object which may be closer to the infrared light may appear dark in the infrared image due to low reflectivity. An image may be captured of the same scene while illuminated with natural light from the same viewpoint as the infrared light. The natural light-illuminated image and the infrared light-illuminated image may be compared to create an approximate depth map for the image.

FIG. 1 illustrates an environment in which embodiments of the invention may be located. A camera 100 may be provided. Camera 100 may be capable of capturing and storing digital images. Camera 100 may be a video camera capable of capturing a live audio and video feed. In some embodiments, camera 100 may be part of a 3D video-conferencing system. In some embodiments camera 100 may be a still camera.

Camera 100 may contain an infrared (IR) light source 110 and a natural light source 120. The IR light 110 may be capable of providing illumination from a similar angle and direction as natural light 120. For example, a user may wish to take a still image with camera 100. Camera 100 may continuously operate IR light 110 while the user may be capturing one or more images. Natural light 120 may be mounted close to IR light 110 and may provide natural light to illuminate the scene. Natural light 120 may operate from the same or a similar view point as IR light 110.

Camera 100 may further comprise a lens 140. Lens 140 may not be limited to any particular camera lens, but instead may be any lens capable of capturing a desired image. Lens 140 may be capable of capturing images of scenes illuminated by both IR light 110 and natural light 120. Lens 140 may be connected to an IR filter 130. While camera 100 may also contain one or more conventional filters over the sensors, camera 100 may contain IR filter 130 which may handle the filtering and determination of IR illuminance for each pixel in a captured image. In some embodiments, natural light 120 may be a high intensity natural light which may help eliminate parallax between shadows in the IR image and the natural light image.

For example, in some embodiments the filter pattern for a single pixel ay be represented as:

| R | G | R | G | R |
|---|---|---|---|---|
| G | B | IR | B | G |
| R | G | R | G | R |
| G | B | IR | B | G |
| R | G | R | G | R | where R, G, B, and IR represent red, green, blue, and IR filters 130 respectively.

Camera 100 may contain a demosaicing algorithm stored in a memory 150 capable of handling received IR values. In some embodiments, the demosaicing algorithm may be stored on a processor associated with camera 100. For every time (t), the algorithm may create two sets of data for the image captured. One set of data may be based on the RBG values, while the other set of data may be based solely on the captured IR values. The data stored may include illumination data and reflectance data.

Camera 100 may include one or more data ports, for example, data port 160. Data port 160 may be capable of communication with a remote computer. In some embodiments, the remote computer may contain a processor capable of processing images captured by camera 100. Captured images and associated data may be communicated back and forth through data port 160 to a remote computer. In some embodiments the remote computer may be communicating with data port 160 over a network. The network may include a local network or a wide area network (e.g., the Internet).

It should further be understood that the network capabilities may further include functionality to communicate with other computing devices, communication devices, and/or other systems and are not intended to be limited to the embodiments and examples described herein.

Figure 2:
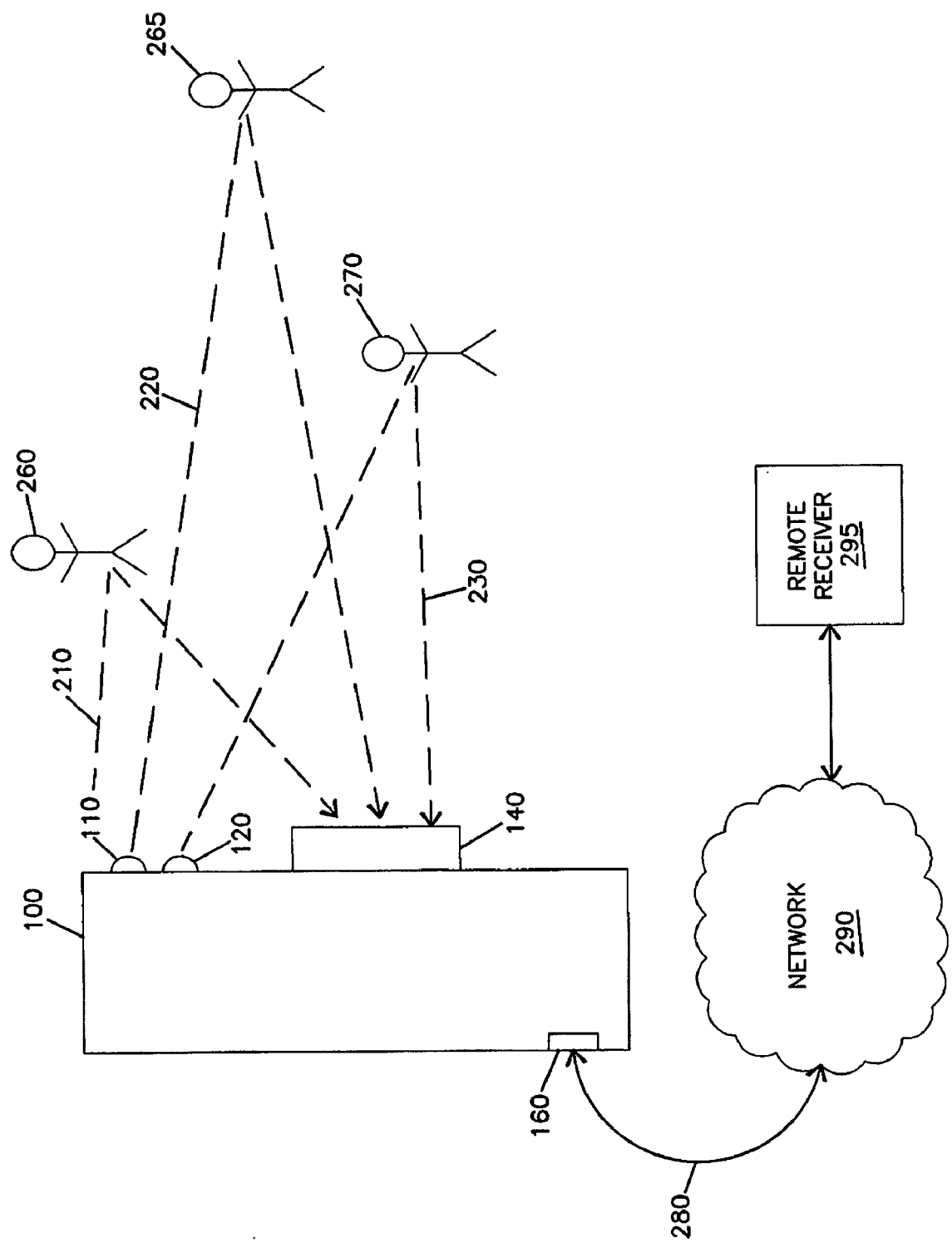
FIG. 2 is a block diagram showing operating embodiments of the invention.

FIG. 2 illustrates a topology for embodiments of the invention. Camera 100 may be capable of capturing a live 3D audio/video feed for a videoconference. Camera 100 may capture an image of a scene containing person 260, person 265, and person 270. Person 260 may be closest in distance from camera 100. Person 265 may be furthest in distance from camera 100. Person 270 may be at an intermediate distance between person 260 and person 265.

In some embodiments, person 260, person 265, and person 270 may be participating in a live 3D video conference with parties at one or more remote locations. The 3D video conference may be communicated between the parties over a network 290. Network 290 may include a local network or a wide area network (e.g., the Internet). Participants in the 3D video conference may be listening and viewing the videoconference through a remote receiver 295.

Camera 100 may be communicating to network 290 through data port 160 over a communications path 280. During the 3D video conference, IR light 110 may continuously illuminate the scene being captured in images by camera 100. Furthermore, natural light 120 may continuously illuminate the scene from the same viewpoint as IR light 110. IR light 110 and natural light 120 may transmit light following a path 210 which travels to person 260 and reflects back to lens 140 where the image may be received. Similarly, IR light and natural light may transmit light following paths 220 and 230 back and forth from person 265 and person 270, respectively.

Path 210 may represent a light path which may provide information on a single pixel of the scene's image. In some embodiments, the information may include at least the R, G, and B intensity values of the pixel in the image illuminated by natural light 120, the IR intensity value of the pixel in the image illuminated by IR light 110, the reflectance of the pixel in the image illuminated by natural light 120, and the IR reflectance of the pixel in the image illuminated by IR light 110. IR filter 130 and one or more additional filters may be employed by camera 100 to decipher the information received through lens 140.

Similarly, light path 220 and light path 230 may provide information about specific pixels in the received image corresponding to person 265 and person 270. Light travelling on path 210 may travel for a shorter distance and a shorter time period than light travelling on path 230 which in turn may travel for a shorter distance and a shorter time period then light travelling on path 220. This information may be directly related to the intensity of the light when it is received by lens 140 at the end of its path. In some embodiments, the normal light intensity at each pixel may be calculated by adding the R, G, and B intensity values for natural light travelling a path reflecting that pixel and dividing the sum by 3.

A processor on camera 100 may then locate the corresponding pixel in the received IR image and determine an IR intensity value for the corresponding pixel. In some embodiments, the IR intensity value may be calculated as a multiplication of IR illumination values and IR reflectance values. Similarly, natural light intensity values may be calculated as a multiplication of normal illumination values and normal reflectance values. Finally, a depth value for the corresponding pixel may be calculated by dividing the IR light intensity value by the normal light intensity value. In some embodiments, the calculations may be based on a constant normal illumination value of 1 as a control point.

Depth values for each pixel in the final image may be calculated and stored in a depth map. The depth map may be stored in memory 150. In some embodiments a depth value of 1 may be calculated for a pixel corresponding to light path 210, a depth value of 2 for the pixel corresponding to light path 230, and depth value of 3 may be calculated for a pixel corresponding to light path 220. These values may represent proportionally how far away the objects are which may be represented by the corresponding pixels.

In some embodiments, the invention may include a time-of-flight based scanner capable of calibrating the processor to decrease potential deviations in the depth map. In some embodiments, for each image processed by camera 100 during a live 3D video conference, the depth map calculated for that image may be transmitted with the image across network 290. When the image is received at remote receiver 295 a processor associated with remote receiver 295 may process the image and the associated depth map for display to other conference participants.

In some embodiments, the processor associated with remote receiver 295 may use the depth map to perform segmentation of the objects in the received image. For example, the depth map provides information to separate objects in an image, such that the processor may provide separate encoding for each of person 260, person 265, and person 270 in a 3D videoconferencing application.

In some embodiments, depth map information may be stored either in memory 150 or an external memory for use in processing the images at a later time. Each depth map may be stored with a unique identifier which may correspond to the associated image and image time.

Figure 3:
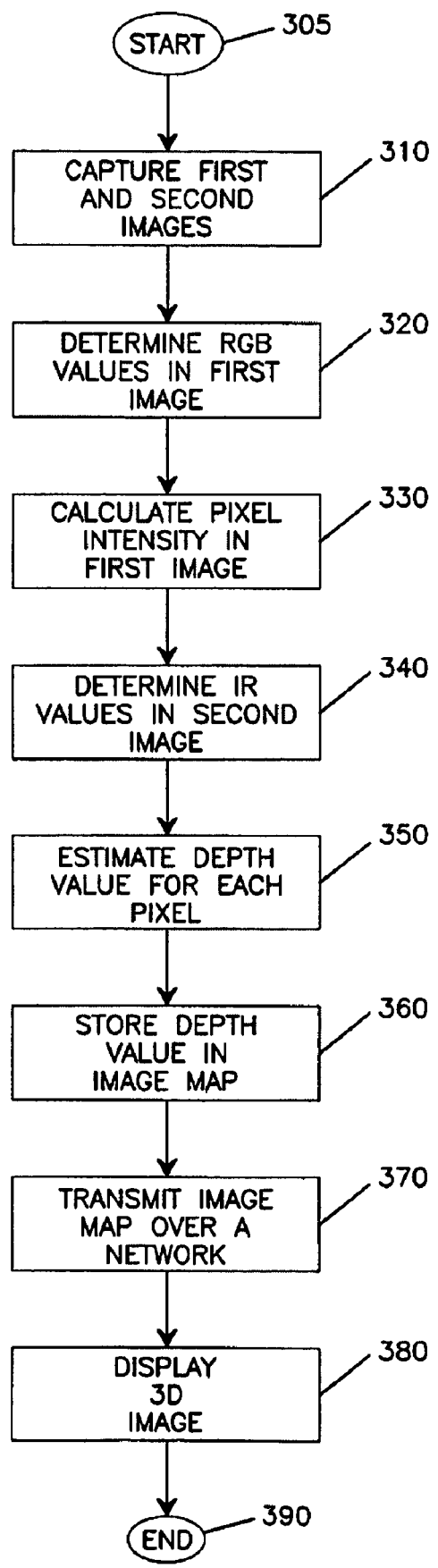
FIG. 3 is a flow chart illustrating operation of embodiments of the invention.

FIG. 3 illustrates a flow chart showing embodiments of the present invention. The method may start at step 305. When a user decides to capture an image with a camera device, the method may proceed to step 310. At step 310, the camera device may capture a first and a second image simultaneously. In some embodiments, the first image may be illuminated by a natural light source. The second image may be illuminated by an IR light source. The first and second images may be saved to a memory associated with the camera device.

Once the first and second images have been obtained by the camera, the method may proceed to step 320. At step 320, the intensity of the R, G, and B values for each pixel in the first image may be calculated. Once the intensity of the R, G, and B values for each pixel in the first image have been calculated, the method may proceed to step 330 where an overall intensity value may be determined for each pixel in the first image. In some embodiments, the calculations of step 330 may be based on the calculated intensity of the R, G, and B values for corresponding pixel.

Once an overall intensity value is calculated for each pixel in the first image, the method may proceed to step 340. At step 340, an IR intensity value for each pixel in the second image may be calculated. Once the IR intensity for each pixel in the second image has been calculated, the method may proceed to step 350.

At step 350, a depth value is estimated for each pixel in the image. In some embodiments, the depth value may equal a ratio between the calculated IR intensity and the calculated overall intensity value of each corresponding pixel. Once the depth value for each pixel is calculated, the method may proceed to step 360 where the depth values may be stored to an image map. The image map may be stored in a memory physically located on the camera. Once the image map is stored on the camera device, the method may proceed to step 370.

At step 370, the image map may be transmitted over a network. The network may be a local network or an external network, such as the Internet. In some embodiments, the image map may be transferred to a receiver, such as remote receiver 295 that is capable of decoding the communication and displaying the image. Once the image map has been transmitted, the method may proceed to step 380.

At step 380, the receiver may decode the received images and associated image maps. The receiver may employ the associated image maps to apply object segmentation techniques on the image. Performing object segmentation may allow for the enhancement of each definable object in a 3D image. After object segmentation and enhancement occur at the receiver, the resultant image may be displayed to participants at the location of the receiver. Once the image has been displayed, the method may end at step 390.

Figure 4:
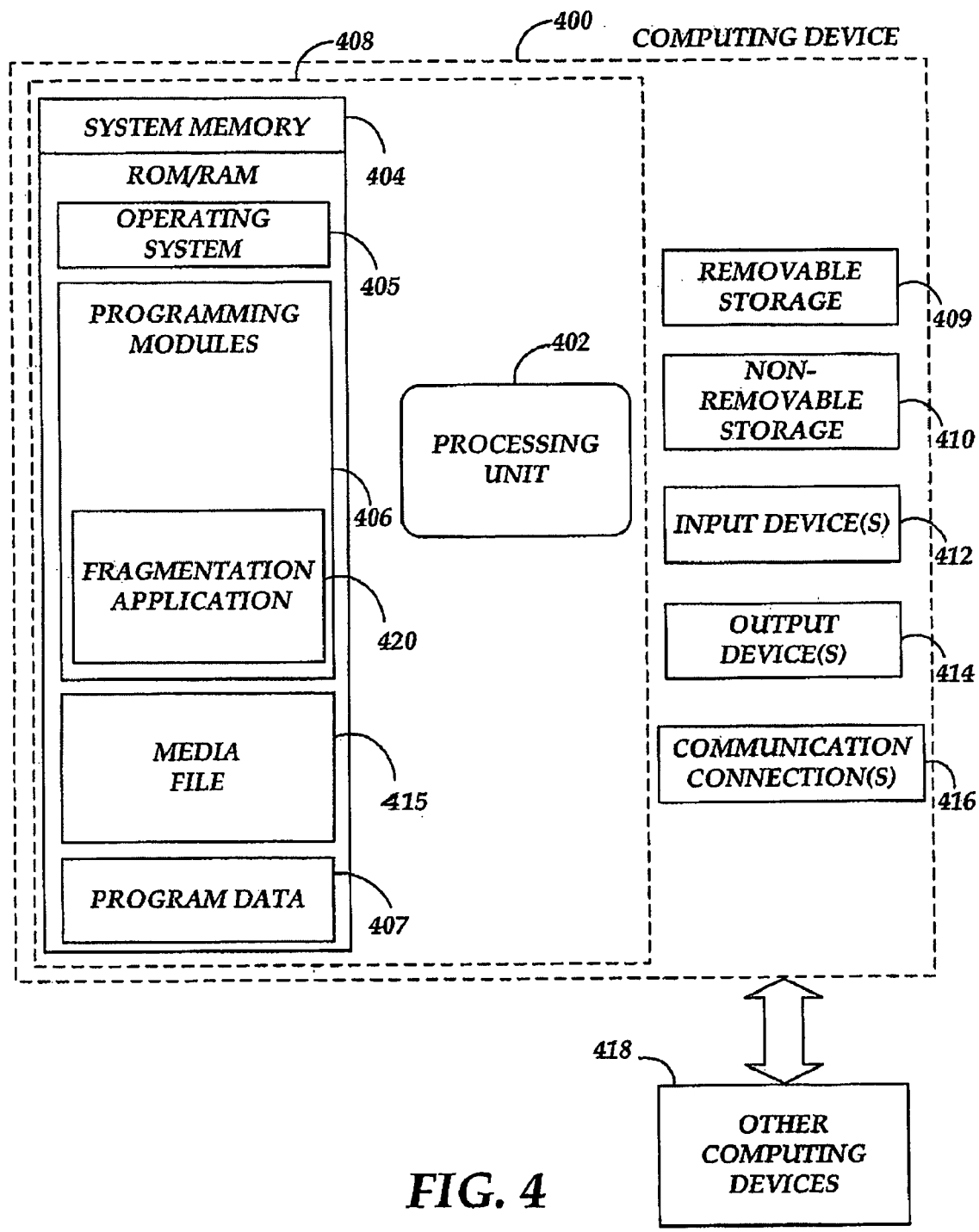
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for creating and processing image maps as described above. The described system may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, and one or more programming modules such as a network routing service 420. Operating system 405, for example, may be suitable for controlling computing device 400's operation. In one embodiment, the programming modules may include programs that communicate via a network 410. Furthermore, embodiments of the invention may be practiced in conjunction with a graphics library, other operating systems, or any other application program and is not limited to any particular application or system.

Computing device 400 may have additional features or functionality. For example, computing device 400 may also include additional data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. System memory 404, the removable storage, and the non-removable storage are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) such as a keyboard, a mouse, a pen, a sound input device, a touch input device, etc. Output device (s) such as a display, speakers, a printer, etc. may also be included. The aforementioned devices are examples and others may be used.

Computing device 400 may also contain a communication connection that may allow device 400 to communicate with other computing devices 418, such as over network 410 in a distributed computing environment, for example, an intranet or the Internet. The communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules (e.g. messaging application 408) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The methods and systems described may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of some embodiments of the present invention. Alternatively, these diagrams may be viewed as depicting actions of an example of a method implemented by some embodiments of the invention. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method comprising:
capturing a first image illuminated by natural light;
capturing a second image illuminated by infrared light, wherein the second image is captured at the same time as the first image;
determining R, G, and B values for each pixel in the first image;
calculating an intensity for each pixel in the first image;
calculating an IR intensity for each pixel in the second image;
estimating a depth value for each pixel using the ratio of the IR intensity and the intensity of corresponding pixels in the first and second images; and
storing the estimated depth value for each pixel in an image depth map.

2. The method of claim 1, further comprising: normalizing the estimated depth values for each pixel prior to storing the estimated depth values.

3. The method of claim 1, wherein calculating the intensity for each pixel in the first image comprises multiplying the level of natural light illumination with the calculated reflectance of the natural light at each pixel.

4. The method of claim 1, wherein calculating the IR intensity for each pixel in the second image comprises multiplying the level of IR light illumination with the calculated reflectance of the IR light at each pixel.

5. The method of claim 4, further comprising: setting a calculated reflectance of the natural as equal to the calculated reflectance of the IR light at each pixel.

6. The method of claim 1, further comprising: employing the image depth map for object segmentation.

7. The method of claim 6, wherein the object segmentation is used for live videoconferencing.

8. The method of claim 6, further comprising: correcting for reflectivity values associated with specific objects identified through object segmentation.

9. The method of claim 1 further comprising: illuminating the natural light and IR light from the same viewpoint.

10. A system comprising:
a camera comprising: an IR light source, wherein the IR light source is continuously on while the camera is in an image-capture mode;
a natural light source;
an IR filter;
a processor associated with the camera programmed to run a demosaicing algorithm to process IR intensity and IR reflectance;
the processor further programmed to create an RGB version and an IR version of each captured image frame;

the processor further programmed to perform a comparison of the RGB version and the IR version to calculate a depth map for a final version of each captured image frame; and a time-of-flight based scanner capable of calibrating the processor to decrease potential deviations in the depth map.

11. The system of claim 10, wherein the camera comprises a video camera.

12. The system of claim 10, wherein the processor is located external to the camera.

13. The system of claim 10, wherein the camera contains a lens capable of simultaneously capturing an image illuminated the IR light source and an image illuminated by the IR light source.

14. A computer-readable medium which stores a set of instructions which when executed performs a method, the method executed by the set of instructions comprising:

storing a calculated intensity for each pixel in a first image;

storing a calculated IR intensity for each pixel in a second image captured at the same time as the first image; and creating a depth map for a third image by estimating a depth value for each pixel using the ratio of the IR intensity and the intensity of corresponding pixels in the first and second images.

15. The computer-readable medium of claim 14, further comprising:

communicating the third image and the image map to a remote receiver.

16. The computer-readable medium of claim 15, further comprising:

segmenting the objects viewable in the third image based on the depth map.

17. The computer-readable medium of claim 16, further comprising:

displaying a 3D version of the third image using object segmentation information.

18. The computer-readable medium of claim 14, further comprising:

processing the first image and second image through a plurality of filters.

19. The computer-readable medium of claim 16, further comprising:

correcting for reflectivity values associated with specific objects identified through object segmentation.

* * * * *